(12) United States Patent
Kun-Tsai

(10) Patent No.: US 6,854,568 B2
(45) Date of Patent: Feb. 15, 2005

(54) CASTER BRAKING DEVICE

(76) Inventor: Sung Kun-Tsai, P.O. Box 487, Chang-Hua City (TW), 500

( * ) Notice: Subject to any disclaimer, the term of this patent is extended or adjusted under 35 U.S.C. 154(b) by 0 days.

(21) Appl. No.: 10/612,923

(22) Filed: Jul. 7, 2003

(65) Prior Publication Data

US 2004/0129507 A1 Jul. 8, 2004

(30) Foreign Application Priority Data

Jan. 8, 2003 (TW) ...................................... 92200425 U

(51) Int. Cl.$^7$ .............................................. B60B 33/00
(52) U.S. Cl. ........................... 188/1.12; 188/29; 188/31
(58) Field of Search ........................... 188/1.12, 19, 20, 188/29, 31; 16/35 R

(56) References Cited

U.S. PATENT DOCUMENTS

| | | | | |
|---|---|---|---|---|
| 4,110,866 A | * | 9/1978 | Ishii ........................... | 16/35 R |
| 4,669,580 A | * | 6/1987 | Neville ........................ | 188/1.12 |
| 4,941,552 A | * | 7/1990 | Screen ........................ | 188/1.12 |
| 5,328,000 A | * | 7/1994 | Rutter et al. ................ | 188/1.12 |
| 6,619,438 B1 | * | 9/2003 | Yang ........................... | 188/1.12 |

* cited by examiner

Primary Examiner—Douglas C. Butler
Assistant Examiner—Bradley T King

(57) ABSTRACT

A caster braking device which comprises the following elements. A wheel has a protruding rim with an axial hole in a center of the protruding rim. A supporting seat has a round mask one side of which is connected to a vertical tube. An axial rod has one end installed with a stopper. A positioning rod has an upper end. A sliding seat has a U-like shape; two guide posts being transversally formed between two legs of the sliding seat so that a guide groove being formed between the two guide posts. The two guide posts are placed in the recess of the positioning rod. A pin passes through the pinhole of the positioning rod and the guide groove of the sliding seat so as to combine the positioning rod and the sliding seat.

2 Claims, 5 Drawing Sheets

CASTER BRAKING DEVICE

FIELD OF THE INVENTION

The present invention relates to casters, and particularly to a caster braking device. A braking device is assembled between the caster and a supporting seat for controlling the braking structure. Thereby, the caster can be braked or moves easily.

BACKGROUND OF THE INVENTION

Referring to FIG. 7, a prior art caster is illustrated. The caster includes a wheel 10 one side of which is pivotally connected to a bearing seat 2o. A center of the leg wheel has an axial hole 11 for being engaged with an axial tube 23 of the supporting seat 20. The supporting seat 20 is formed by a round mask 21 and a vertical tube 22 at one lateral side of the mask 21. The mask 21 has an opening. The axial tube 23 protrudes axially from the opening. An axial rod 30 is tightly coupled to a hole of the axial tube 23. One end thereof is formed with stop 31. Thereby, by above components, when the axial tube 23 of the supporting seat 20 is coupled to the axial hole 11 of the wheel 10. The axial rod 30 is pivotally installed to the axial tube 23 for assembling the wheel 10 and the supporting seat 20 so that the wheel 10 can rotate freely. The defect of above structure is that no braking device is installed therein.

SUMMARY OF THE INVENTION

Accordingly, the primary object of the present invention is to provide a caster braking device which comprises the following elements. A wheel has a protruding rim with an axial hole in a center of the protruding rim. A supporting seat has a round mask one side of which is connected to a vertical tube. An axial rod has one end installed with a stopper. A positioning rod has an upper end. A sliding seat has a U-like shape; two guide posts being transversally formed between two legs of the sliding seat so that a guide groove being formed between the two guide posts. The two guide posts are placed in the recess of the positioning rod. A pin passes through the pinhole of the positioning rod and the guide groove of the sliding seat so as to combine the positioning rod and the sliding seat.

The various objects and advantages of the present invention will be more readily understood from the following detailed description when read in conjunction with the appended drawing.

DETAILED DESCRIPTION OF THE PREFERRED EMBODIMENTS

Figure 1:
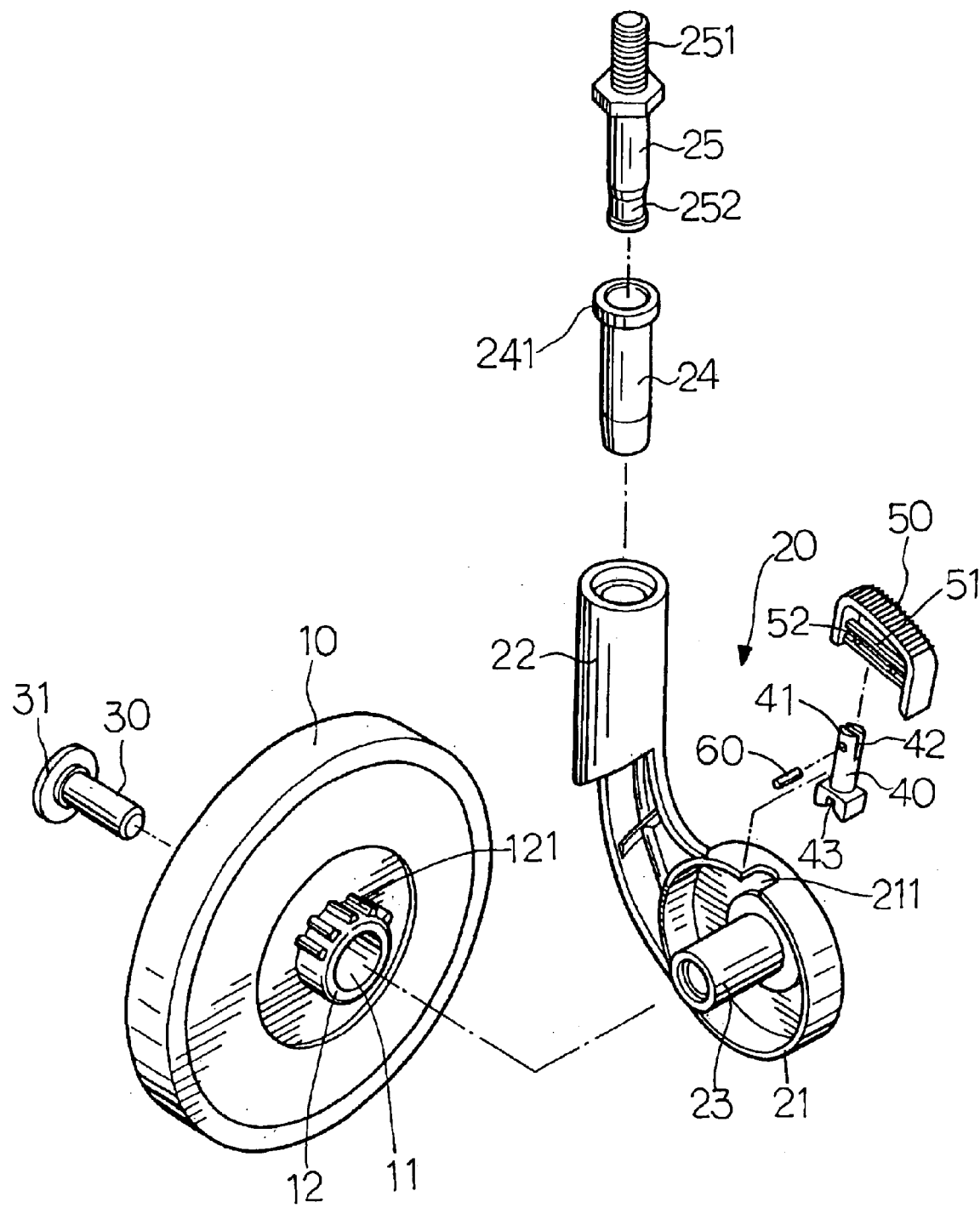
FIG. 1 is a structural exploded view of the present invention.

Referring to FIG. 1, the caster braking device of the present invention is illustrated. The caster braking device of the present invention comprises the following elements.

A wheel 10 has a protruding rim 12 with an axial hole 11 in the center of the protruding rim 12. An outer periphery of the protruding rim 12 is formed with a plurality of teeth 121 which are spaced with an equal space.

A supporting seat 20 has a round mask 21 one side of which is connected to a vertical tube 22. An opening of the round mask 21 is axially installed with an axial tube 23. The axial tube 23 is engaged to the axial hole 11 of the wheel 10. An upper end of the round mask 21 is formed with a slot 211 for installing with a positioning rod 40. The vertical tube 22 is tightly coupled with a sleeve 24 and a screw rod 25. A bottom of the inner tube of the sleeve 24 is formed with a flange 241. An upper end of the screw rod 25 has thread 251 at an outer surface thereof for screwing an object to be mounted on the caster. A lower end of the screw rod 25 is formed with a reduced section 252. When the lower end of the screw rod 25 is inserted into the sleeve 24, the reduced section 252 serves to confine a flange 242 of the sleeve 24 so that the screw rod 25 can move upwards and downward.

An axial rod 30 has one end installed with a stopper 31. When the axial tube 23 of the supporting seat 20 is inserted into the axial hole 11 of the wheel 10, by the axial rod 30 to be tightly engaged to the axial tube 23. The wheel 10 is assembled to the supporting seat 20.

A positioning rod 40 has an upper end. A pinhole 41 is formed in the positioning rod 40 and the upper end of the positioning rod 40 has a recess 42. A lower end of the positioning rod 40 has a buckling groove 43 for being buckled by one tooth 121 of the wheel 10.

Figure 2:
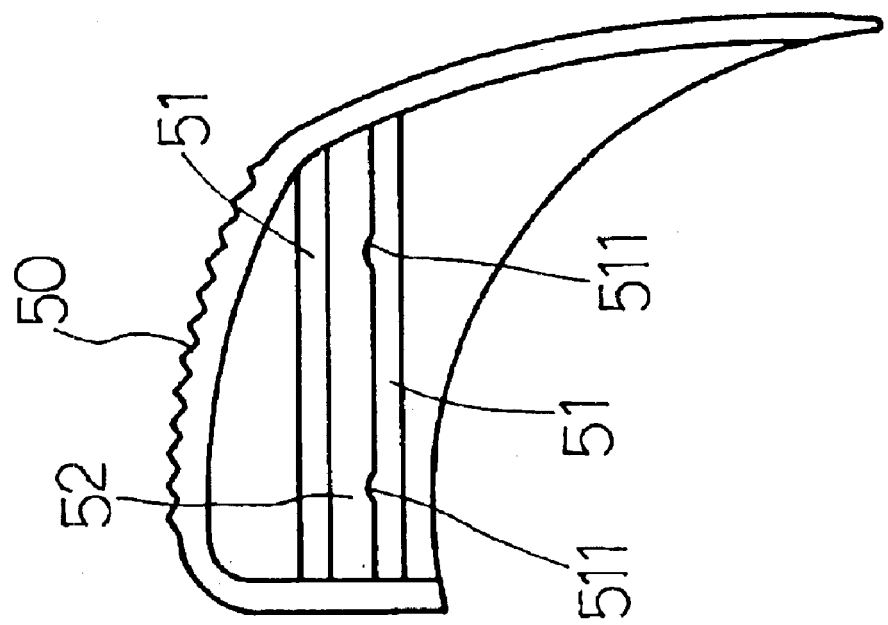
FIG. 2 is a plane view showing the sliding seat of the present invention.
Figure 5:
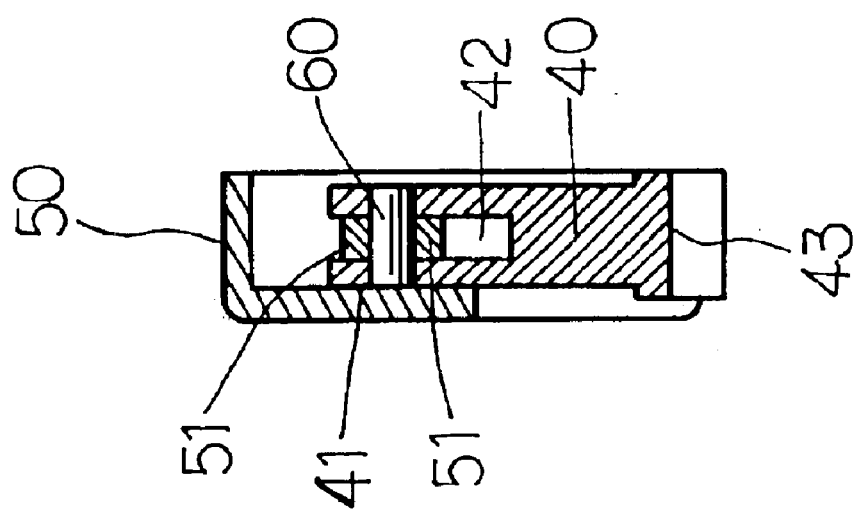
FIG. 5 is an assembled cross sectional view 'showing the assembly of the sliding seat and the positioning rod.

A sliding seat 50 has a U shape and two guide posts 51 are transversally formed between two legs of the sliding seat 50 so that a guide groove 52 is formed between the two guide posts 51. The two guide posts 51 are placed in the recess 42 of the positioning rod 40. A pin 60 passes through the pinhole 41 of the positioning rod 40 and the guide groove 52 of the sliding seat 50 so as to combine the positioning rod 40 and the sliding seat 50 (referring to FIG. 5). The pin 60 is movable leftward and rightward in the guide groove 52. Two sides of the top of the guide post 51 have respective two nose portions 511 for positioning the pin 60 (referring to FIGS. 2 to 4).

Figure 4:
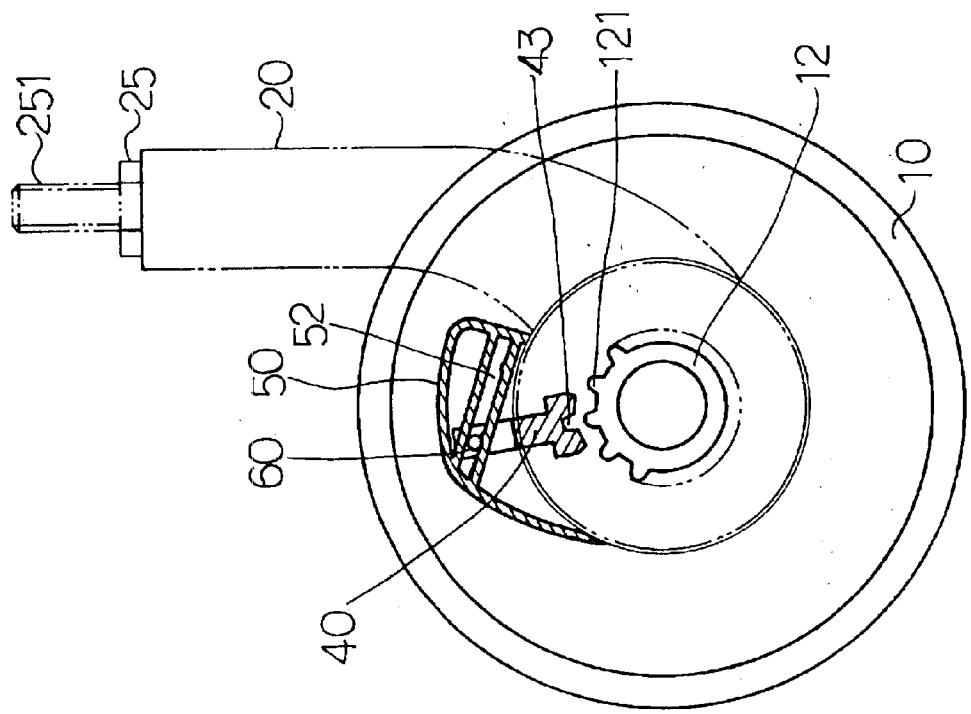
FIG. 4 is a schematic view showing the operation of the present invention.
Figure 3:
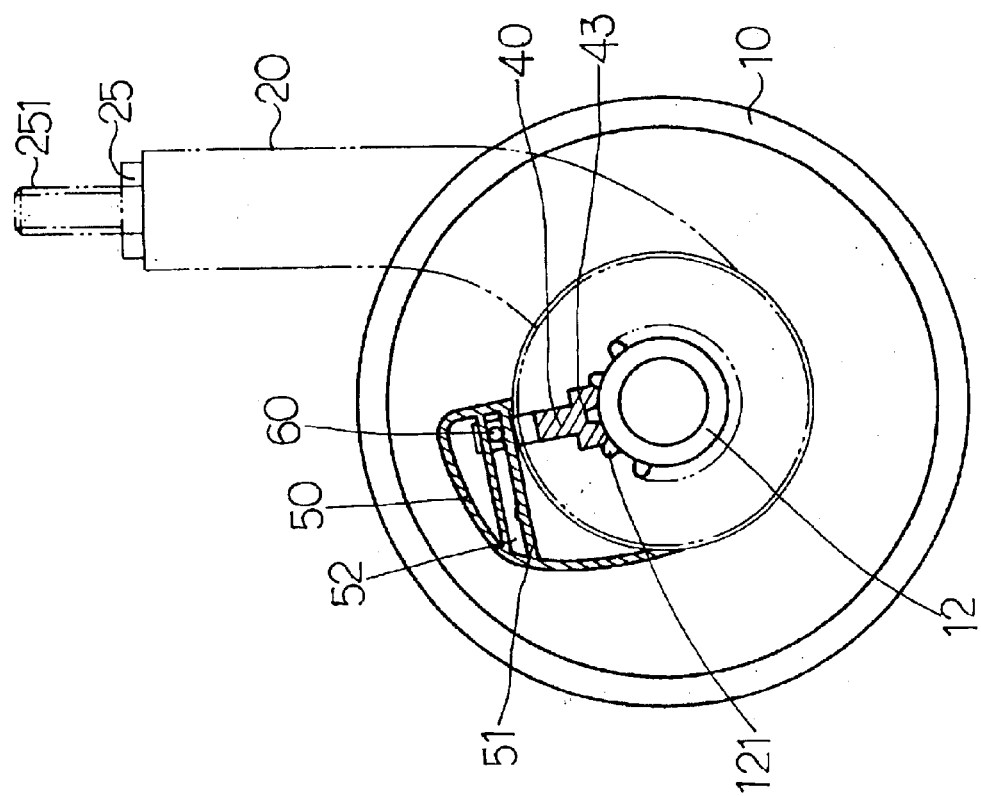
FIG. 3 is an assembled cross sectional view of the present invention.
Figure 6:
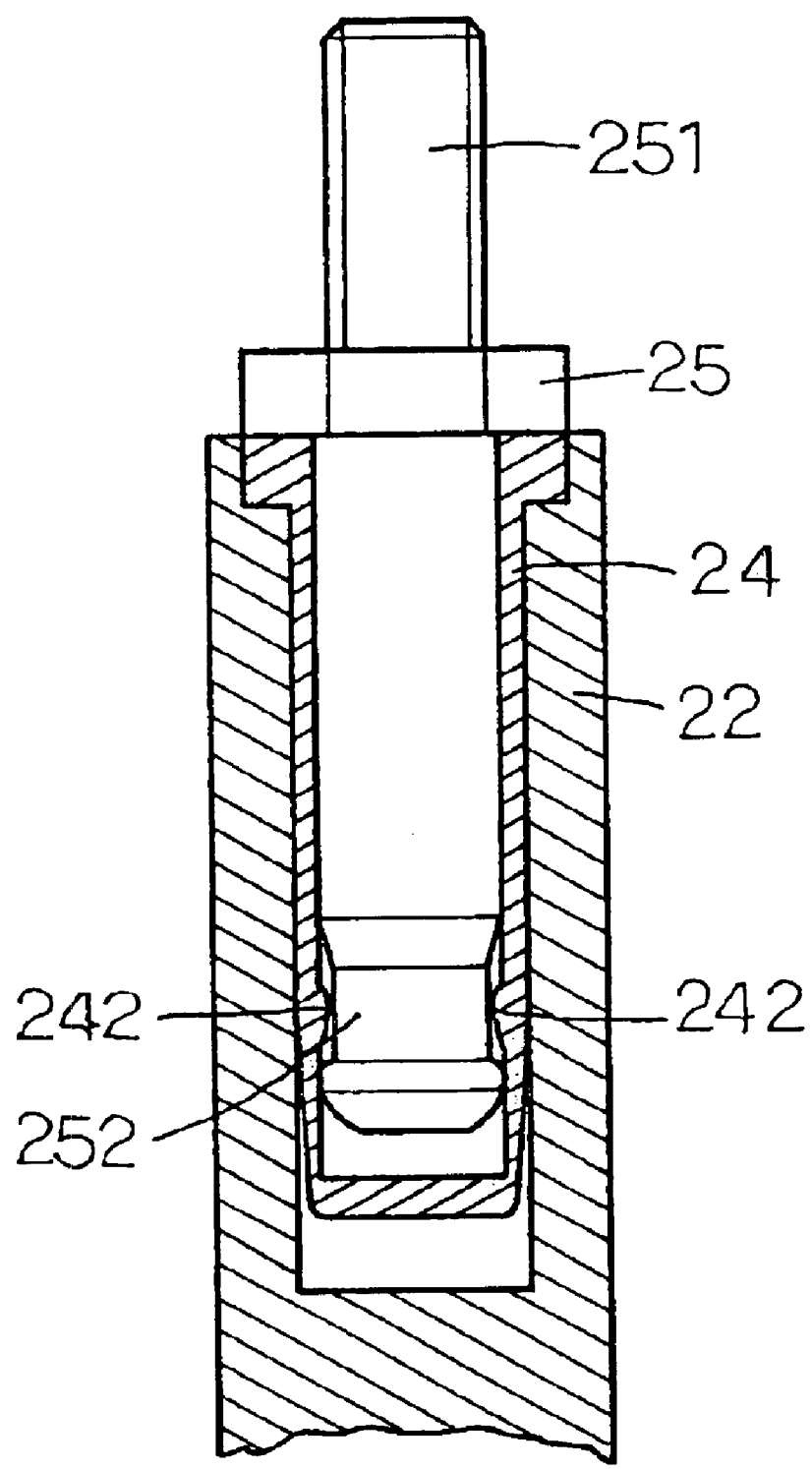
FIG. 6 is an assembled cross sectional view of the supporting seat and the screw rod of the present invention.
Figure 7:
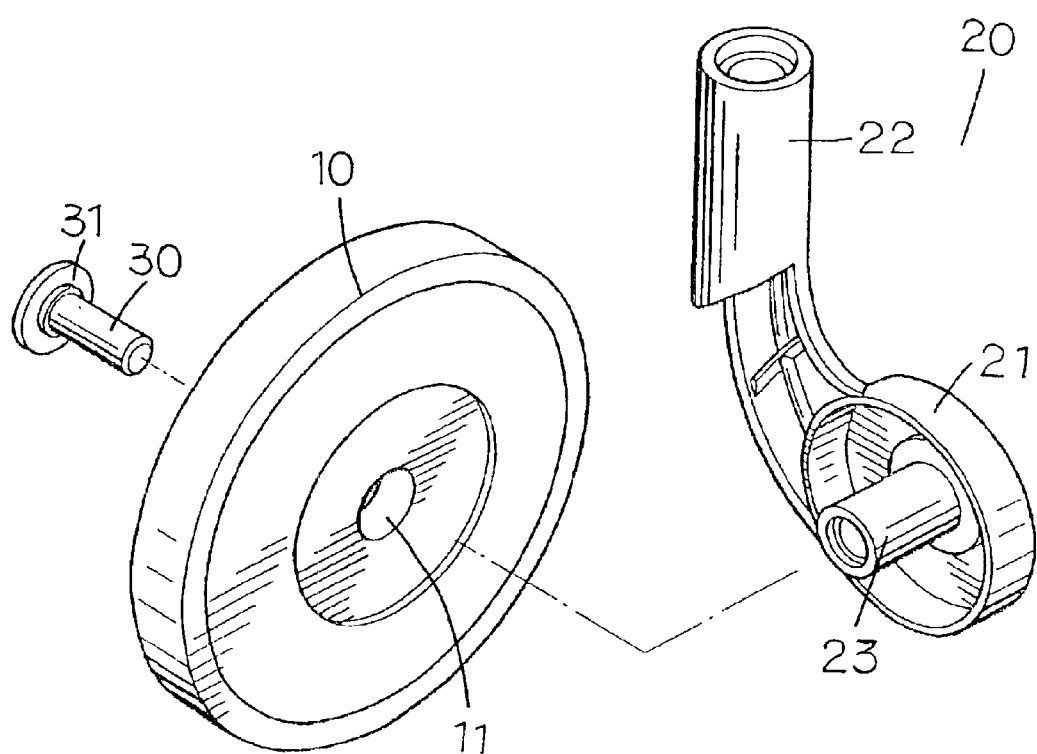
FIG. 7 is an exploded perspective view of the prior art caster.

With reference to FIGS. 3 and 4, the assembled cross section views of the present invention are illustrated. When the sliding seat 50 is pushed so as to adhere to and move along the round mask 21 of the supporting seat 20. Since the guide grooves 52 between the two guide grooves 51 are inclined with different slopes, the pin 60 moves leftwards and rightwards so as to drive the positioning rod 40 to move upwards and downwards. Thereby, the buckling groove 43 at the bottom of the positioning rod 40 can be buckled to one tooth 121 of the wheel 10 so that the wheel 10 is braked and thus positioned or the buckling groove 43 leaves from the tooth 121 of the wheel 10. Thereby, the wheel 10 may slide automatically.

The present invention is thus described, it will be obvious that the same may be varied in many ways. Such variations are not to be regarded as a departure from the spirit and scope of the present invention, and all such modification's as would be obvious to one skilled in the art are intended to be included within the scope of the following claims.

What is claimed is:

1. A caster braking device comprising:
   a wheel having a protruding rim with an axial hole; an outer periphery of the protruding rim being formed with a plurality of teeth which are spaced with an equal space;

a supporting seat having a round mask one side of which is connected to a vertical tube; an axial tube being formed in an opening of the round mask; the axial tube being engaged to the axial hole of the wheel; an upper end, of the round mask being formed with a slot;

an axial rod; the axial tube of the supporting seat receiving the axial rod; the wheel being rotatable freely;

a positioning rod being formed in the slot of the round mask; a pinhole being formed in the positioning rod and an upper end of the positioning rod having a recess; a lower end of the positioning rod having a buckling groove for buckling one tooth of the wheel;

a sliding seat having a U shape; two guide posts being transversally formed between two legs of the sliding seat so that a guide groove being formed between the two guide posts; the two guide posts being placed in the recess of the positioning rod; a pin passes through the pinhole of the positioning rod and the guide groove of the sliding seat so as to combine the positioning rod and the sliding seat; the pin being movable in the guide groove so that as the sliding seat is pushed, the positioning rod is movable up and down; so that the buckling groove is buckled with the tooth of the wheel to brake the wheel or the buckling groove retracts from the teeth of the wheel so that the wheel is slidable.

2. The caster braking device as claimed in claim 1, wherein two ends of the top of the guide post have respective two nose portions for positioning the pin when the pin moves leftwards and rightwards in the guide groove.

* * * * *